US010696357B2

(12) United States Patent
Lazzarin et al.

(10) Patent No.: US 10,696,357 B2
(45) Date of Patent: Jun. 30, 2020

(54) ROCKER FOR A BICYCLE GEAR

(71) Applicant: Campagnolo S.r.l., Vicenza (IT)

(72) Inventors: Leopoldo Lazzarin, Vicenza (IT); Paolo Pasqua, Camisano Vicentino (IT); Alessandro Sorio, Villafranca di Verona (IT)

(73) Assignee: Campagnolo S.r.l., Vicenza (IT)

( * ) Notice: Subject to any disclaimer, the term of this patent is extended or adjusted under 35 U.S.C. 154(b) by 303 days.

(21) Appl. No.: 15/455,878

(22) Filed: Mar. 10, 2017

(65) Prior Publication Data

US 2017/0259881 A1    Sep. 14, 2017

(30) Foreign Application Priority Data

Mar. 11, 2016  (IT) .............................. UA2016A1565

(51) Int. Cl.
*B62M 9/121*    (2010.01)
*B62M 9/126*    (2010.01)
*B62M 9/12*     (2006.01)

(52) U.S. Cl.
CPC .............. *B62M 9/121* (2013.01); *B62M 9/12* (2013.01); *B62M 9/126* (2013.01)

(58) Field of Classification Search
CPC ...... B62M 9/126; B62M 9/124; B62M 9/121; B62M 9/12; B62M 2009/12406; B62M 9/131; B62M 9/134
USPC .................................................... 474/80, 82
See application file for complete search history.

(56) References Cited

U.S. PATENT DOCUMENTS

| | | | | |
|---|---|---|---|---|
| 3,402,942 A | * | 9/1968 | Shimano | B62M 9/126 280/236 |
| 4,058,020 A | * | 11/1977 | Huret | B62M 9/126 474/80 |
| 4,183,255 A | | 1/1980 | Leiter | |
| 4,226,131 A | * | 10/1980 | Yamasaki | B62M 9/1248 474/134 |
| 4,403,978 A | * | 9/1983 | Huret | B62M 9/126 267/155 |
| 4,433,963 A | * | 2/1984 | Shimano | B62M 9/16 474/134 |
| 4,580,327 A | * | 4/1986 | Juy | B29C 45/0017 29/413 |

(Continued)

FOREIGN PATENT DOCUMENTS

| | | |
|---|---|---|
| CN | 1915738 A | 2/2007 |
| DE | 1161775 B | 1/1964 |
| DE | 3113700 A1 | 10/1982 |

OTHER PUBLICATIONS

Italian Search Report and Written Opinion in Italian Application No. UA2016A001565, dated Nov. 2, 2016, with English translation.

(Continued)

*Primary Examiner* — Michael R Mansen
*Assistant Examiner* — Raveen J Dias
(74) *Attorney, Agent, or Firm* — Volpe and Koenig, P.C.

(57) ABSTRACT

A rocker for a bicycle gear that has an inner plate, an outer plate, a pair of pins integral with said inner and outer plates and a pair of toothed wheels arranged between them. Each toothed wheels is rotatably mounted on a respective pin. At least one pin is inserted in non-threaded through holes formed in the inner and outer plates and is defined by a screw with an outer threading and a female screw with an inner threading engaged with the outer threading.

14 Claims, 8 Drawing Sheets

(56) References Cited

U.S. PATENT DOCUMENTS

| | | | | |
|---|---|---|---|---|
| 5,350,339 | A * | 9/1994 | Carmichael | B62M 9/16 474/120 |
| 5,466,194 | A * | 11/1995 | Steinberg | B62M 9/126 474/80 |
| 7,666,111 | B2 * | 2/2010 | Shahana | B62M 9/125 474/80 |
| 2002/0068653 | A1 * | 6/2002 | Dal Pra | B62M 9/126 474/82 |
| 2005/0192138 | A1 * | 9/2005 | Sze | B62M 9/126 474/78 |
| 2005/0218623 | A1 * | 10/2005 | Oishi | B62M 9/1242 280/200 |
| 2007/0021246 | A1 | 1/2007 | Shahana et al. | |
| 2008/0058136 | A1 * | 3/2008 | Muramoto | B62M 9/126 474/82 |
| 2008/0153640 | A1 * | 6/2008 | Nagasawa | B62M 9/126 474/80 |
| 2008/0194363 | A1 * | 8/2008 | Kunisawa | B62M 9/126 474/82 |
| 2009/0137354 | A1 * | 5/2009 | Oseto | B62M 9/126 474/82 |
| 2009/0247334 | A1 * | 10/2009 | Takachi | B62M 9/1248 474/82 |
| 2010/0093472 | A1 * | 4/2010 | Oseto | B62M 9/126 474/80 |
| 2012/0083371 | A1 * | 4/2012 | Yamaguchi | B62M 9/126 474/80 |
| 2012/0083372 | A1 * | 4/2012 | Yamaguchi | B62M 9/126 474/80 |
| 2013/0252772 | A1 * | 9/2013 | Scolari | B62M 9/04 474/80 |
| 2014/0371013 | A1 * | 12/2014 | Yamaguchi | B62M 9/1244 474/122 |
| 2018/0346058 | A1 * | 12/2018 | Brown | B62K 25/286 |

OTHER PUBLICATIONS

Retrieved from the Internet: Shimano XTR Shadow Derailleur Reviews, dated Aug. 4, 2010. URL:http://www.mtbr.com/cat/drivetrain/derailleur/shimano/xtr-shadow/prd_428592_116crx.aspx [retrieved on Nov. 1, 2016].

Chinese Office Action, dated Feb. 6, 2020, for Chinese Application No. 201710145615.7.

* cited by examiner

ROCKER FOR A BICYCLE GEAR

CROSS REFERENCE TO RELATED APPLICATION(S)

This application claims the benefit of Italian Application No. UA2016A001565, filed on Mar. 11, 2016 and incorporated herein by reference as if fully set forth.

FIELD OF INVENTION

The present invention relates to a rocker for a bicycle gear. Preferably, the bicycle is a racing bicycle.

BACKGROUND

In particular, the bicycle gear to which reference is made in the context of this patent description is the rear one, which moves the chain between the different sprockets of the sprocket assembly associated with the rear wheel of the bicycle.

A rear gear typically comprises an articulated quadrilateral actuation kinematic mechanism that is actuated mechanically by a sheathed cable (mechanically-actuated rear gear) or electrically by an electric motor (electrically-actuated rear gear).

In particular, the rear gear typically comprises a first body fixed to the bicycle frame, a second body that supports a rocker and a pair of articulation connecting-rods that connect the first body and the second body.

The rocker comprises, as its essential elements, an inner plate, an outer plate, a pair of pins integral with the inner and outer plates and a pair of toothed wheels arranged between the inner and outer plates.

Each toothed wheel is rotatably mounted on a respective pin of the pair of pins.

In the prior art, pins are used that consist of screws provided with a head and threaded shank. The pins are mounted at respective pairs of holes made on the outer plate and on the inner plate.

Typically, the threaded shanks of the screws are screwed into threaded through holes of the inner plate, until the heads of the screws abut on the outer plate.

The inner plate is typically made from light alloy such as aluminum or carbon fiber or technopolymer, so as to conveniently make the threading of the relative threaded through holes. In the case in which the inner plate is made of carbon fiber or technopolymer the threaded through holes are made in appropriate metallic inserts.

The Applicant has found that a rocker of the type described above has some drawbacks.

In particular, the Applicant has found that the upper wheel (i.e. the one that is higher up when the rocker is mounted on the bicycle) of such a rocker, in the operative configuration in which the rear gear has selected the largest sprocket of the sprocket assembly (i.e. the sprocket of the sprocket assembly that is closest to the bicycle wheel), is at an extremely short distance with respect to the bicycle wheel, such a distance being called in jargon "X factor".

The Applicant has observed that, particularly in the case of lenticular wheels, in the case of bumps or irregular road surface the inner plate could accidentally move towards the wheel and interfere and rub against it.

Such a risk is also due to the fact that the inner plate, in order to be able to make a sufficient number of grip threads there, must have a predetermined thickness (which the Applicant has measured to be, for example, equal to about 2.2 mm).

Moreover, given that an end portion of the shank of the screws typically projects with respect to the inner plate, there is the risk of such an end portion being able to rub on the bicycle wheel.

The technical problem at the basis of the present invention is to provide a rocker for a bicycle gear that is constructively simple, cost-effective and reliable and that overcomes the aforementioned drawbacks.

SUMMARY

The present invention therefore relates to a rocker for a bicycle gear, comprising: inner and outer plates; a pair of pins; and a pair of toothed wheels arranged between the inner and outer plates on a respective one of the pair of pins. At least one of the pins, inserted in non-threaded holes through the inner and outer plates, is defined by a screw having an outer threading and a female screw having an inner threading that is engaged with the outer threading.

Preferably, said inner and outer plates are made from an aluminum alloy or carbon fiber or technopolymer.

Advantageously, a reduction in weight of the rocker is thus obtained, which the Applicant estimates to be, for example, about 5 g, with respect to the case of an aluminum rocker.

BRIEF DESCRIPTION OF THE DRAWING(S)

Further features and advantages of the present invention will become clearer from the following detailed description of preferred embodiments thereof, made with reference to the attached drawings and given for indicating and not limiting purposes. In such drawings.

DETAILED DESCRIPTION OF THE PREFERRED EMBODIMENT(S)

In the rest of the description and in the following claims, the terms "inner plate" and "outer plate" refer, respectively, to the plate of the rocker that, when the rocker is mounted on the bicycle, faces the bicycle wheel and to the plate of the rocker that, in the aforementioned mounting condition, is arranged on the opposite part with respect to a bicycle wheel.

The present invention therefore relates to a rocker for a bicycle gear, comprising:

an inner plate;
an outer plate;
a pair of pins integral with said inner and outer plates;

a pair of toothed wheels arranged between said inner and outer plates, each of said toothed wheels being rotatably mounted on a respective pin of said pair of pins;

wherein at least one of said pins is inserted in non-threaded through holes formed in said inner and outer plates and is defined by:

a screw having an outer threading and an abutment surface at one of said inner and outer plates;

a female screw having an inner threading engaged with said outer threading and an abutment surface at the other of said inner and outer plates.

Advantageously, the rocker according to the present invention brilliantly overcomes the drawbacks of the rocker made according to the prior art.

Indeed, thanks to the fact that non-threaded through holes are formed in the inner and outer plate, it is possible to reduce the thickness of the plates, thus also of the inner plate, since it is no longer necessary to make—like in the prior art—a certain minimum number of threads.

For this reason, in the operative configuration in which rear gear has selected the largest sprocket of the sprocket assembly, the inner plate is at a greater distance from the wheel with respect to that at which it is in the rockers of the prior art described above. Consequently, in the case of bumps or irregular road surface, the risk of the inner plate being able to interfere and rub on the bicycle wheel is drastically reduced.

In particular, the thickness of the inner plate can be reduced for example up to about 1.5 mm. A reduction in weight of the rocker is thus also obtained.

Moreover, again because of the fact that the holes in the inner and outer plates are not threaded, such plates can be made from carbon fiber or technopolymer. A further reduction in weight of the rocker is thus obtained with respect to the case of an aluminum rocker.

Furthermore, since no portion of the thickness of the plates has to be dedicated to making threads, it is possible to embed heads of the screw and of the female screw in recesses specially created in the plates, in this way avoiding the presence of parts that project with respect to the plates.

Moreover, the screw—female screw coupling allows a large number of grip threads to be made. This allows the inner plate and the outer plate to be spaced apart one another by a sufficient distance to allow the chain to pass without having to break the links of it, still keeping the two plates engaged with one another through a sufficient number of threads in grip.

Preferred features of the aforementioned rocker are recited in the dependent claims Such features can be combined freely with one another according to the specific requirements of the case.

In a preferred embodiment of the rocker of the present invention, said female screw comprises a coupling seat with a mounting tool.

Advantageously, the mounting tool is inserted into the coupling seat to prevent the female screw from rotating while the screw is screwed onto it.

In a further preferred embodiment of the rocker of the present invention, said female screw comprises an outer surface having a shaped portion to make an anti-rotational shape coupling with one of said inner and outer plates.

Advantageously, the provision of such a shaped portion, as well as preventing the female screw from rotating while the screw is screwed onto it, makes the mounting even easier, which is carried out without using any mounting tool for the female screw.

Preferably, said outer surface is housed in a recess formed in said plate and having a shaped portion of shape at least partially matching the shaped portion of said female screw.

Advantageously, the anti-rotational shape coupling is made by providing on the plate a surface portion intended to cooperate with the shaped portion of the outer surface of the female screw.

Preferably, said shaped portion of said female screw and of said recess is defined by at least one flat surface.

Advantageously, such flat surfaces are easy to make and ensure an easy and correct shape coupling between female screw and recess of the plate.

In a preferred embodiment of the rocker of the present invention, at least one of said toothed wheels is rotatably mounted directly on said female screw.

Advantageously, in this case the pin essentially comprises only two components (screw and female screw) and its mounting and dismounting is particularly easy.

In another preferred embodiment of the rocker of the present invention, at least one of said toothed wheels is rotatably mounted on a bush fitted with or without interference on said female screw and/or on said screw.

In a further preferred embodiment of the rocker of the present invention, at least one of said toothed wheels is rotatably mounted on a rolling bearing fitted with or without interference on said female screw and/or on said screw.

Preferably, the abutment surface of said female screw is housed in a recess formed in one of said inner and outer plates around the respective through hole, said recess comprising an abutment surface for said female screw and on which said through hole erupts.

Advantageously, at least one portion of the female screw can be embedded in the recess, reducing or even preventing parts of the female screw from projecting with respect to the respective plate.

Preferably, said female screw comprises projecting portions coupled with corresponding undercut portions made in said recess.

Advantageously, the projecting portions, once coupled with the undercut portions, allow the female screw to be fastened to the plate, keeping them connected before the screw is screwed into the female screw, thus facilitating the mounting operations of the rocker.

Preferably, at least one of said toothed wheels comprises, in radially inner position, an annular element made from an anti-friction material.

Advantageously, such an annular element allows a sliding rolling which is substantially frictionless between toothed wheel and pin. Such a solution is usable as an alternative to using a rolling bearing.

Preferably, the rocker according to the present invention comprises a pair of annular protection discs fitted on at least one of said pins and arranged at opposite parts with respect to the toothed wheel mounted on said pin. Such annular discs perform the function of protecting the coupling zone between pin and toothed wheel from dust and dirt.

Figure 1:
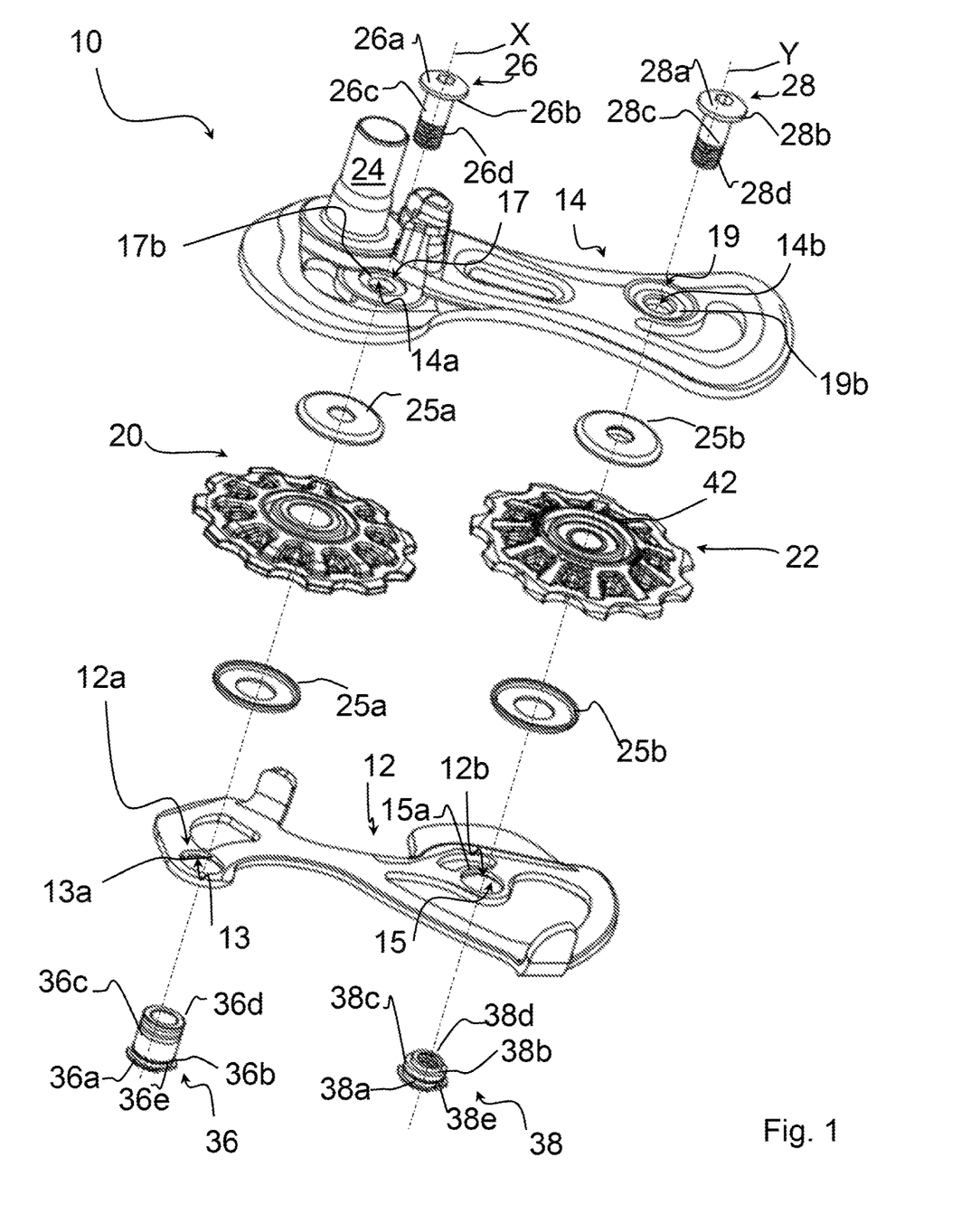
FIG. 1 is an exploded perspective view of a first embodiment of a rocker according to the present invention.
Figure 2:
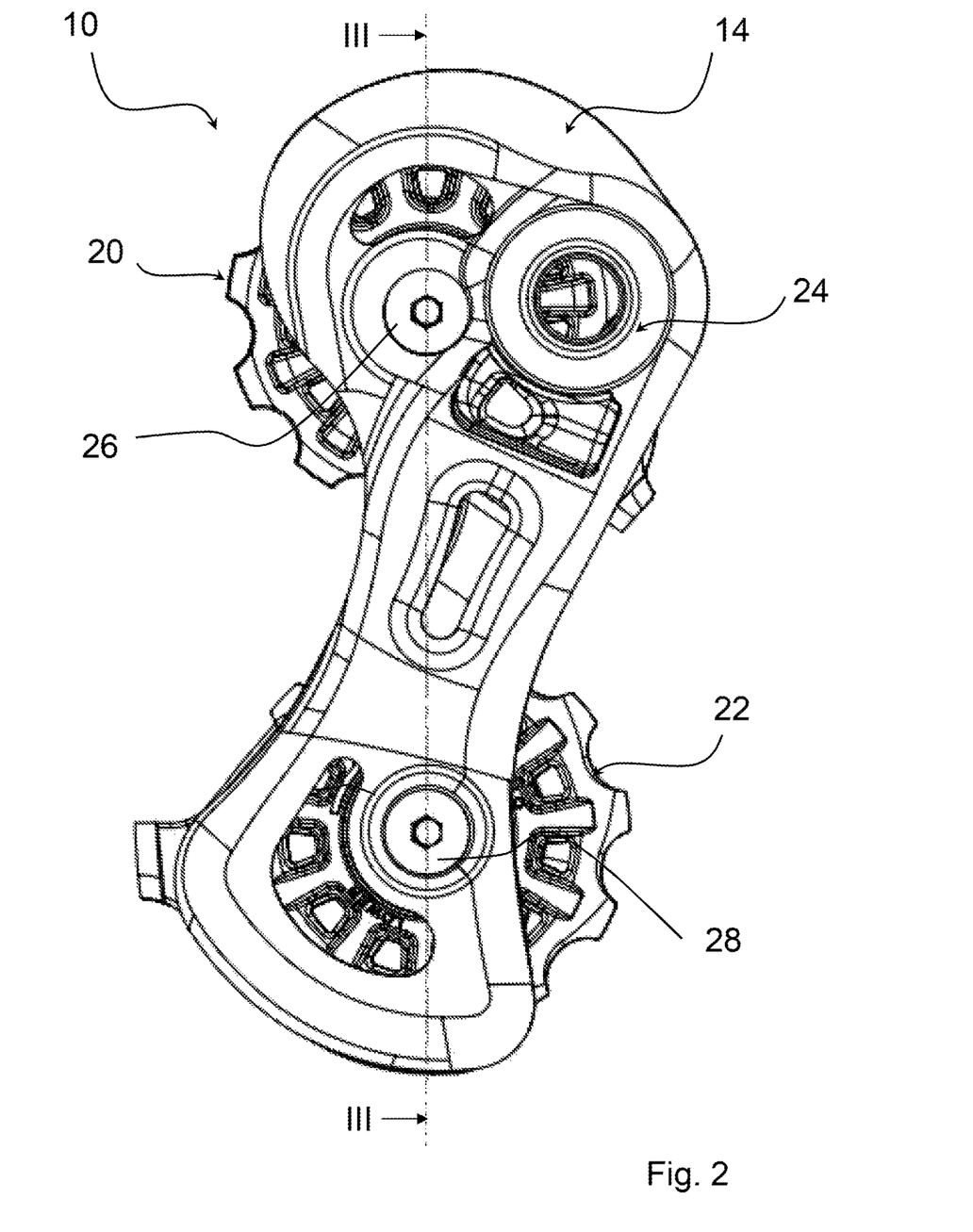
FIG. 2 is a side view of the rocker of FIG. 1.
Figure 3:
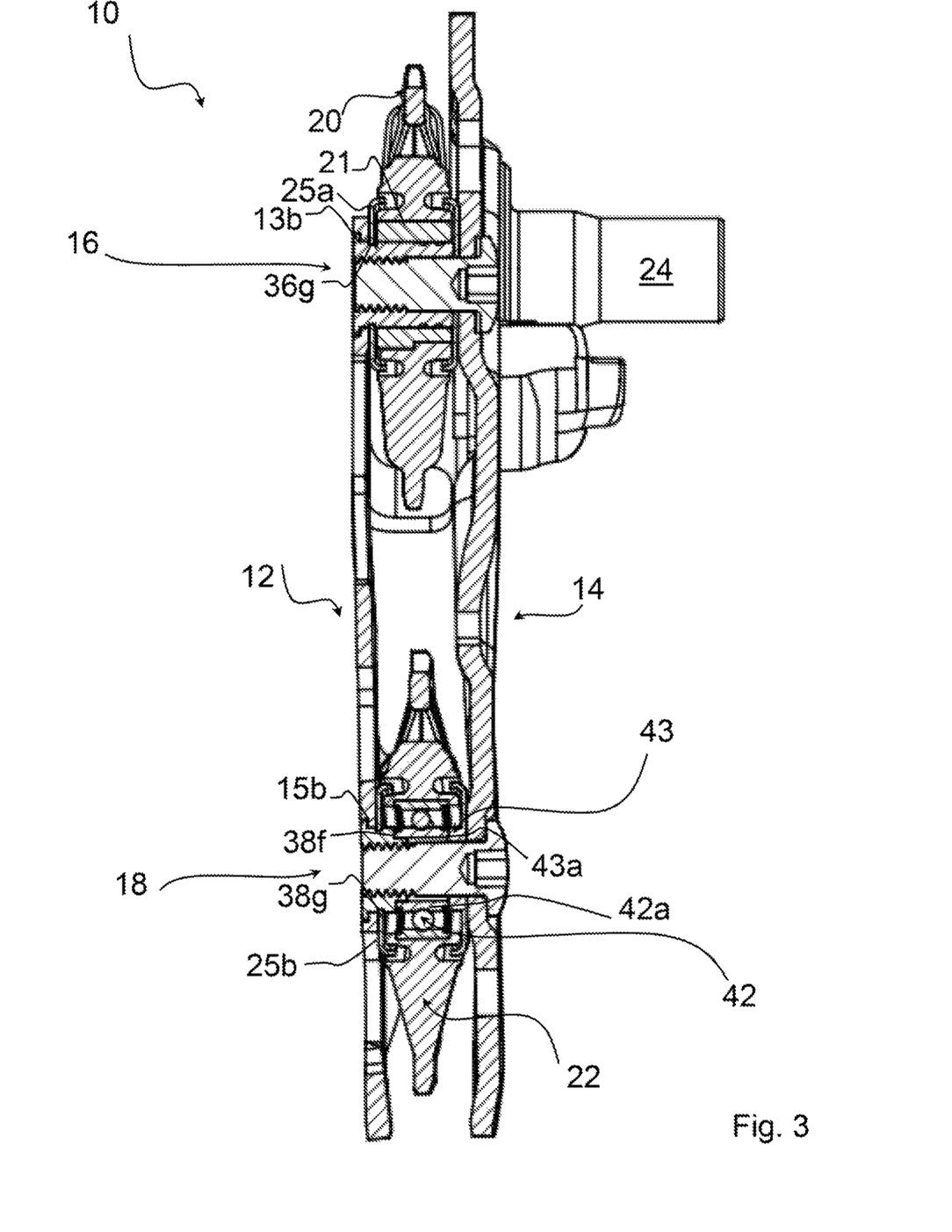
FIG. 3 is a cross section view of the rocker of FIG. 1, taken according to the plane traced with III-III in FIG. 2.

With initial reference to FIGS. 1-3, a first embodiment of a rocker for a bicycle gear according to the present invention is shown. Such a rocker is wholly indicated with 10.

In particular, the bicycle gear is the rear one.

The rocker 10 is connected to the frame of the bicycle through an articulated quadrilateral actuation kinematic mechanism of known type and not illustrated in the Figures.

In particular, the rear gear comprises a first body (not illustrated) fixed to the bicycle frame, a second body (not illustrated) that supports the rocker 10 and a pair of articulation connecting-rods (not illustrated) that connect the first body and the second body.

The rocker 10 comprises an inner plate 12, an outer plate 14, a pair of pins 16, 18 integral with the inner 12 and outer 14 plates, and a pair of toothed wheels 20, 22 arranged between the inner 12 and outer 14 plates.

Each toothed wheel 20, 22 is rotatably mounted on a respective pin 16, 18.

Typically, when the rocker 10 is mounted on the bicycle, the pin 16 (and the toothed wheel 20) is higher up with respect to the pin 18 (and to the toothed wheel 22).

An articulation pin 24 is fixed externally to the outer plate 14, said pin rotatably connecting the rocker 10 to the second body of the rear gear.

The inner plate 12 has a non-threaded through hole 12a for the pin 16 and a non-threaded through hole 12b for the pin 18.

Correspondingly, the outer plate 14 has a non-threaded through hole 14a for the pin 16 and a non-threaded through hole 14b for the pin 18.

The pairs of non-threaded through holes 12a, 14a and 12b, 14b of the inner 12 and outer 14 plate are coaxial, and coincide with rotation axes X and Y of the toothed wheels 20 and 22.

The pin 16 is defined by a screw 26 and a female screw 36.

The screw 26 has a head 26a in which an abutment surface 26b at the outer plate 14 is defined.

The screw 26 further has a shank 26c inserted in the through hole 14a and having a free end portion in which an outer threading 26d is defined.

The head 26a of the screw 26 is housed in a recess 17 formed in the outer plate 14 and on which the through hole 14a erupts.

The recess 17 comprises an abutment surface 17b for the abutment surface 26b of the head 26a of the screw 26.

The female screw 36 comprises a head 36a in which an abutment surface 36b at the inner plate 12 is defined.

The female screw 36 further has a shank 36c inserted in the through hole 12a.

The female screw 36 further has an inner threading 36d engaged with the outer threading 26d of the screw 26.

The toothed wheel 20 is rotatably mounted directly on the female screw 36, in particular on a part of the shank 36c of the female screw 36.

The toothed wheel 20 comprises, in radially inner position, an annular element 21 made from an anti-friction material.

The head 36a of the female screw 36 comprises an outer surface having a shaped portion to make an anti-rotational shape coupling with the inner plate 12. Such a shaped portion is defined by a pair of flat surfaces 36e, substantially parallel and diametrically opposite.

The head 36a of the female screw 36 is housed in a recess 13 formed in the inner plate 12 and on which the through hole 12a erupts. The recess 13 has a shaped portion of shape at least partially matching the shaped portion of the head 36a of the female screw 36. Such a shaped portion is defined by a pair of flat surfaces 13a, substantially parallel and diametrically opposite, which cooperate in abutment with the flat surfaces 36e of the head 36a of the female screw 36. Other shapes are possible that avoid the rotation of the female screw 36 in the recess 13 during the screwing of the screw 26.

The recess 13 comprises an abutment surface 13b for the abutment surface 36b of the head 36a of the female screw 36.

In analogous manner to the pin 16, the pin 18 is defined by a screw 28 and a female screw 38.

The screw 28 has a head 28a in which an abutment surface 28b at the outer plate 14 is defined.

The screw 28 further has a shank 28c inserted in the through hole 14b and having a free end portion in which an outer threading 28d is defined.

The head 28a of the screw 28 is housed in a recess 19 formed in the outer plate 14 and on which the through hole 14b erupts.

The recess 19 comprises an abutment surface 19b for the abutment surface 28b of the head 28a of the screw 28. The female screw 38 comprises a head 38a in which an abutment surface 38b at the inner plate 12 is defined.

The female screw 38 further has a shank 38c inserted in the through hole 12b and an inner threading 38d engaged with the outer threading 28d of the screw 28.

The toothed wheel 22 is rotatably mounted on a rolling bearing 42, which is interposed between pin 18 and toothed wheel 22 itself.

In particular, as illustrated in the example of FIG. 3, an inner ring 42a of the rolling bearing 42 is fitted with or without interference on a housing seat 38f provided on a free end portion of the shank 38c of the female screw 38.

The inner ring 42a is fitted with or without interference also on a housing seat 43a provided on an annular spacer element 43, fitted with or without interference on the shank 28c of the screw 28. The annular spacer element 43 is arranged in abutment on the surface of the outer plate 14 facing the toothed wheel 22.

The head 38a of the female screw 38 comprises an outer surface having a shaped portion to make an anti-rotational shape coupling with the inner plate 12. Such a shaped portion is defined by a pair of flat surfaces 38e, substantially parallel and diametrically opposite.

The head 38a of the female screw 38 is housed in a recess 15 formed in the inner plate 12 and on which the through hole 12b erupts. The recess 15 has a shaped portion of shape at least partially matching the shaped portion of the head 38a of the female screw 38. Such a shaped portion is defined by a pair of flat surfaces 15a, substantially parallel and diametrically opposite, which cooperate in abutment with the flat surfaces 38e of the head 38a of the female screw 38.

The recess 15 comprises an abutment surface 15b for the abutment surface 38b of the head 38a of the female screw 38.

The rocker 10 further comprises a pair of annular protection discs 25a and 25b, which are fitted on each of the pins 16 and 18 and which are arranged on opposite parts with respect to the toothed wheels 20 and 22, respectively.

In the non-limiting example of FIG. 3, the annular protection discs 25a, 25b of the pins 16 and 18, in particular those arranged adjacent to the inner plate 12, are mounted in respective circumferential grooves 36g, 38g made on the shanks 36c and 38c of the female screws 36 and 38.

In the non-limiting example of FIG. 3, the annular protection disc 25b arranged adjacent to the outer plate 14 is formed in one piece with the annular spacer element 43.

Figure 4:
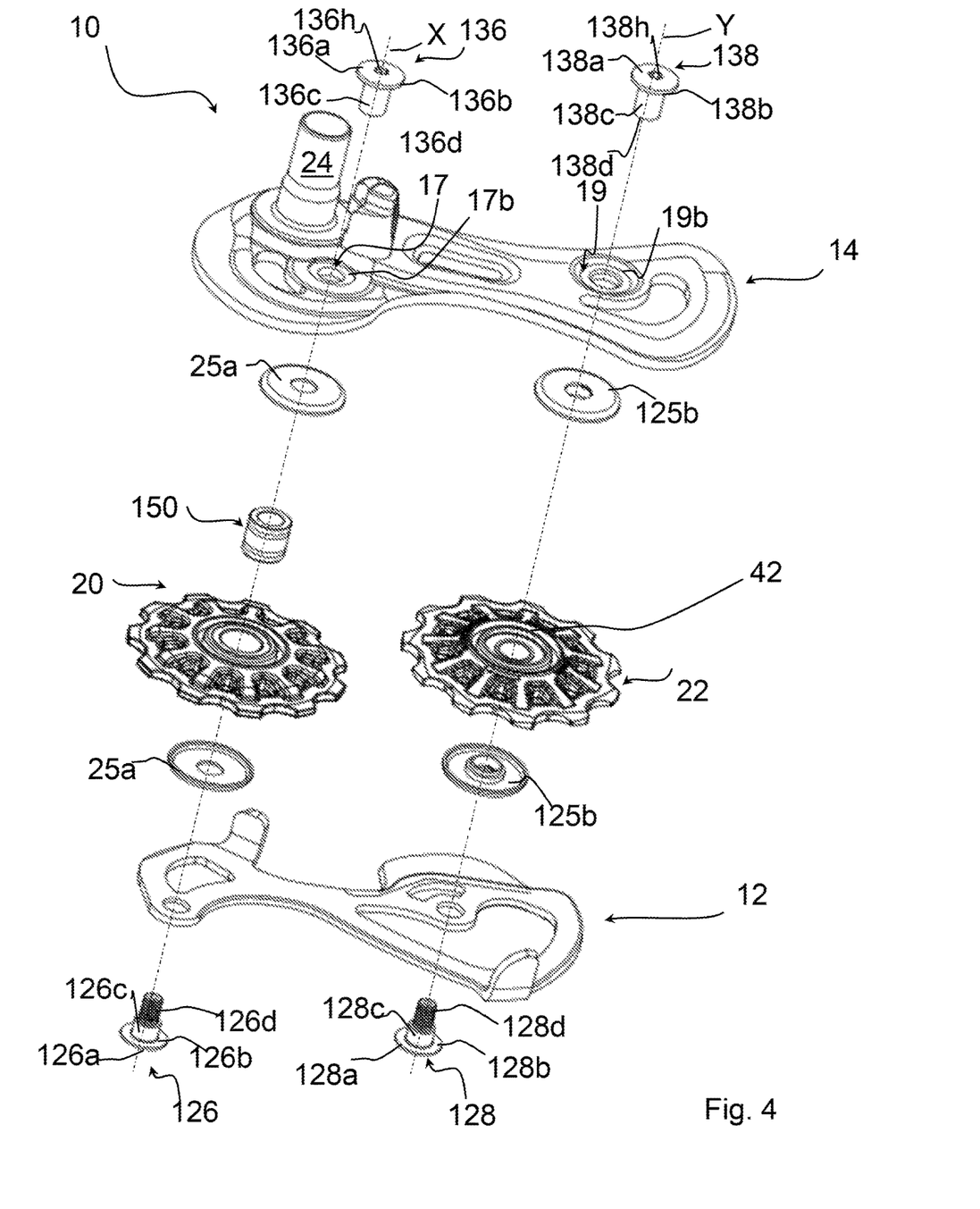
FIG. 4 is an exploded perspective view of a second embodiment of a rocker according to the present invention.
Figure 5:
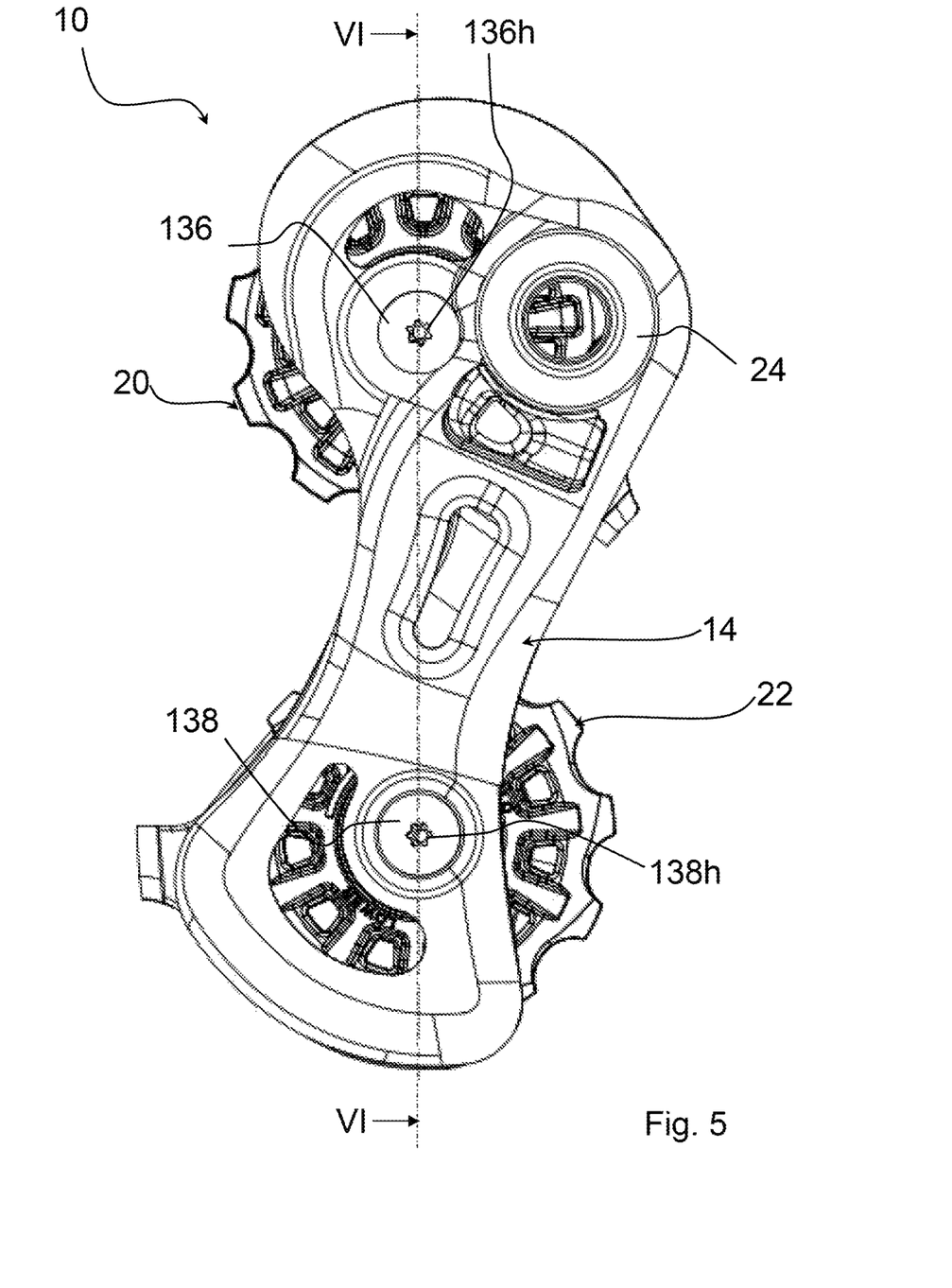
FIG. 5 is a side view of the rocker of FIG. 4.
Figure 6:
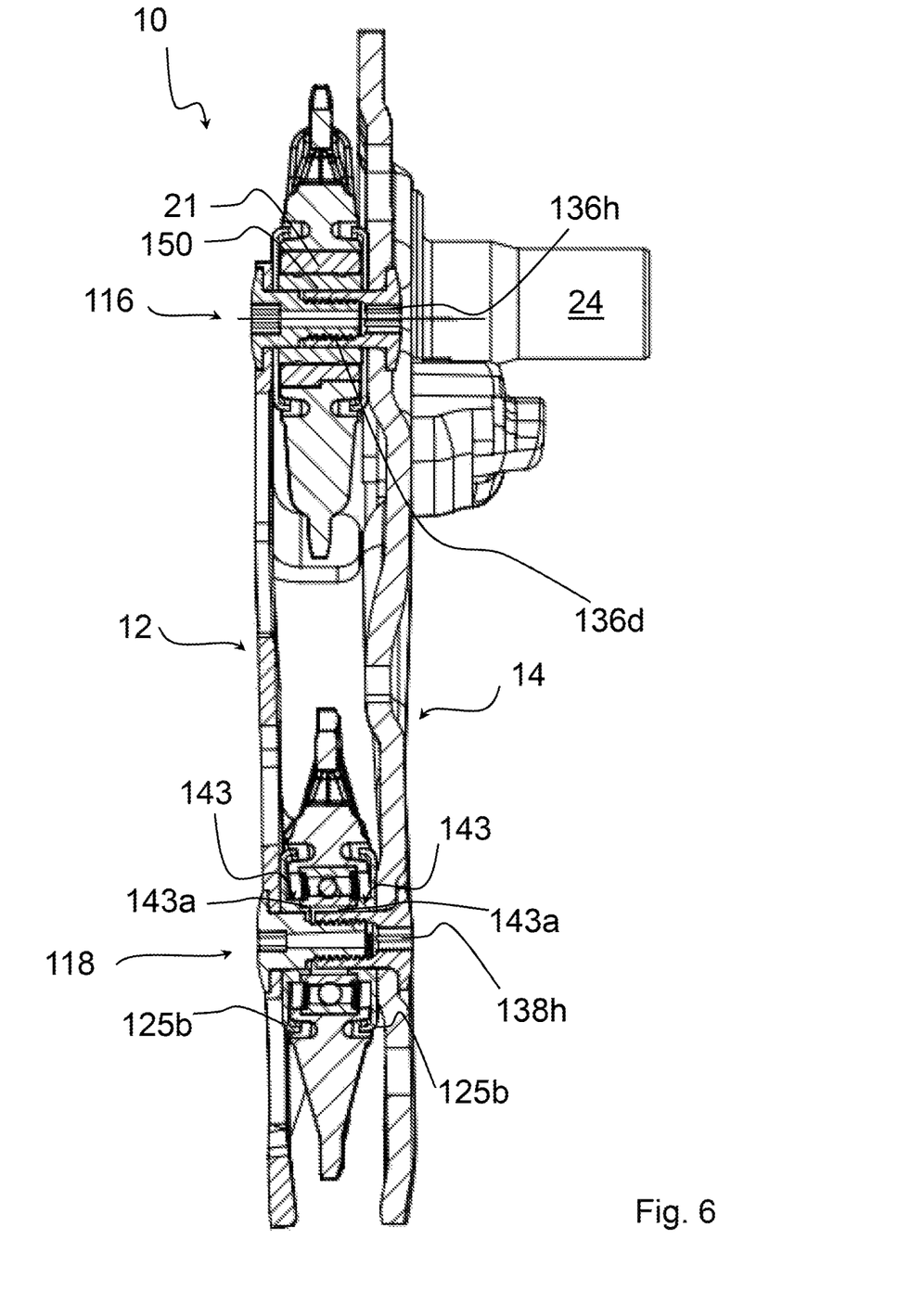
FIG. 6 is a cross section view of the rocker of FIG. 4, taken according to the plane traced with VI-VI in FIG. 5.

FIGS. 4-6 show a second embodiment of a rocker 10 for a bicycle gear according to the present invention.

The components of the rocker 10 of FIGS. 4-6 analogous or functionally equivalent to those of the rocker 10 of FIGS. 1-3 are indicated with the same reference numeral and for their description reference is made to what is stated above.

The rocker 10 comprises an inner plate 12, an outer plate 14, a pair of pins 116, 118 integral with the inner 12 and outer 14 plates, and a pair of toothed wheels 20, 22 arranged between the inner 12 and outer 14 plates.

The rocker 10 of FIGS. 4-6 differs from the rocker 10 of FIGS. 1-3 substantially in the pins 116 and 118.

The pin 116 is defined by a screw 126 and a female screw 136.

The screw 126 has a head 126a in which an abutment surface 126b at the inner plate 12 is defined.

The screw 126 further has a shank 126c inserted in the through hole 12a and having a free end portion in which an outer threading 126d is defined.

In particular, the free end portion in which the outer threading 126d is defined has a reduced nominal diameter with respect to a remaining portion of the shank 126c.

The head 126a of the screw 126 is housed in a recess formed in the inner plate 12 and on which the through hole 12a erupts. Such a recess comprises an abutment surface for the abutment surface 126b of the head 126a of the screw 126.

The female screw 136 comprises a head 136a in which an abutment surface 136b at the outer plate 14 is defined.

The female screw 136 also has a shank 136c inserted in the through hole 14a.

The female screw 136 also has an inner threading 136d, which is made at the shank 136c of the female screw 136 and which is engaged with the outer threading 126d of the screw 126.

The toothed wheel 20 is rotatably mounted on a bush 150 fitted with or without interference on the female screw 136 and on the screw 126, in particular on part of the shank 136c of the female screw 136 and on part of the portion of the shank 126c of the screw 126 in which the outer threading 126d is not defined.

The bush 150 acts as a rotation bush of the toothed wheel 20.

The toothed wheel 20 comprises, in radially inner position, an annular element 21 made from an anti-friction material.

The female screw 136 comprises a coupling seat 136h with a mounting tool. The coupling seat 136h erupts on the head 136a of the female screw 136.

The head 136a of the female screw 136 is housed in a recess 17 formed in the outer plate 14 and on which the through hole 14a erupts.

The recess 17 comprises an abutment surface 17b for the abutment surface 136b of the head 136a of the female screw 136.

In analogous manner to the pin 116, the pin 118 is defined by a screw 128 and a female screw 138.

The screw 128 has a head 128a in which an abutment surface 128b at the inner plate 12 is defined.

The screw 128 further has a shank 128c inserted in the through hole 12b and having a free end portion in which an outer threading 128d is defined.

The head 128a of the screw 128 is housed in a recess formed in the inner plate 12 and on which the through hole 12b erupts. Such a recess comprises an abutment surface for the abutment surface 128b of the head 128a of the screw 128.

The female screw 138 comprises a head 138a in which an abutment surface 138b at the outer plate 14 is defined.

The female screw 138 also has a shank 138c inserted in the through hole 14a.

The female screw 138 further has an inner threading 138d, which is made at the shank 138c of the female screw 138 and which is engaged with the outer threading 128d of the screw 128.

The female screw 138 comprises a coupling seat 138h with a mounting tool. The coupling seat 138h erupts on the head 138a of the female screw 138.

The head 138a of the female screw 138 is housed in a recess 19 formed in the outer plate 14 and on which the through hole 14b erupts.

The recess 19 comprises an abutment surface 19b for the abutment surface 138b of the head 138a of the female screw 138.

The toothed wheel 22 is rotatably mounted on a rolling bearing 42, which is interposed between pin 118 and toothed wheel 22 itself.

In particular, as illustrated in the example of FIG. 6, an inner ring 42a of the rolling bearing 42 is fitted with or without interference on respective housing seats 143a provided on a pair of annular spacer elements 143, fitted with or without interference on the shank 128c of the screw 128 and on the shank 138c of the female screw 138.

The annular spacer elements 143 are arranged in abutment, respectively, on the surfaces of the inner plate 12 and of the outer plate 14 facing the toothed wheel 22.

The rocker 10 of FIGS. 4-6 further comprises a pair of annular protection discs 25a and 125b, which are fitted on each of the pins 116 and 118 and which are arranged at opposite parts with respect to the toothed wheels 20 and 22, respectively.

In the non-limiting example of FIG. 6, the annular protection discs 25a of the pin 116 are fitted on the shanks 126c and 136c of the screw 126 and female screw 136.

The annular protection discs 25a of the pin 116 are arranged at opposite parts with respect to the bush 150.

In the non-limiting example of FIG. 6, the annular protection discs 125b of the pin 118 are formed in one piece with the respective annular spacer elements 143.

In an alternative embodiment (not illustrated), the position of at least one of the screws 126, 128 and of the corresponding female screw 136, 138 could be inverted, i.e. the screw 126 (and/or the screw 128) could be inserted in the through hole 14a (and/or in the through hole 14b) of the outer plate 14, and the corresponding female screw 136 (and/or the female screw 138) could be inserted in the through hole 12a (and/or in the through hole 12b) of the inner plate 12.

Figure 7:
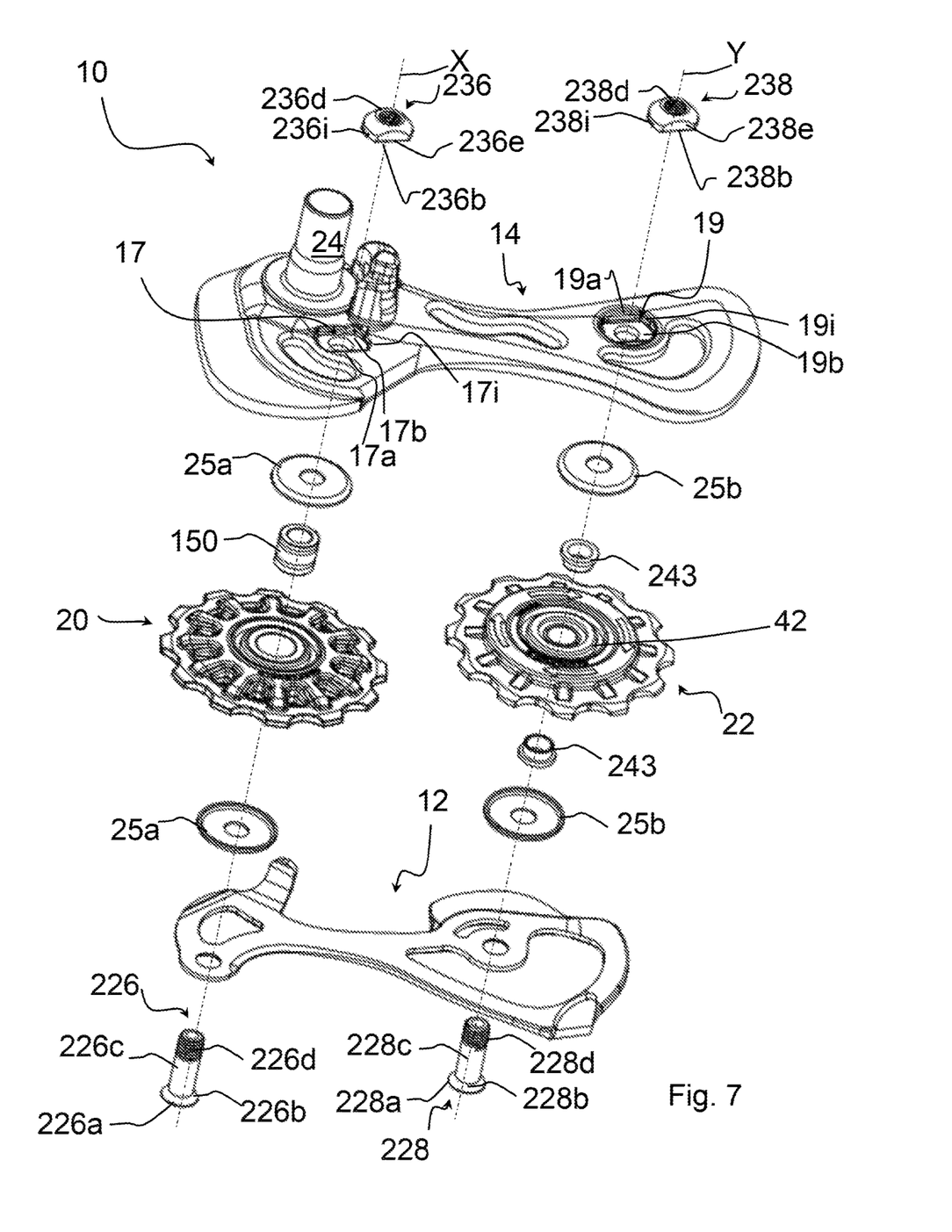
FIG. 7 is an exploded perspective view of a third embodiment of a rocker according to the present invention.
Figures 8, 8A:
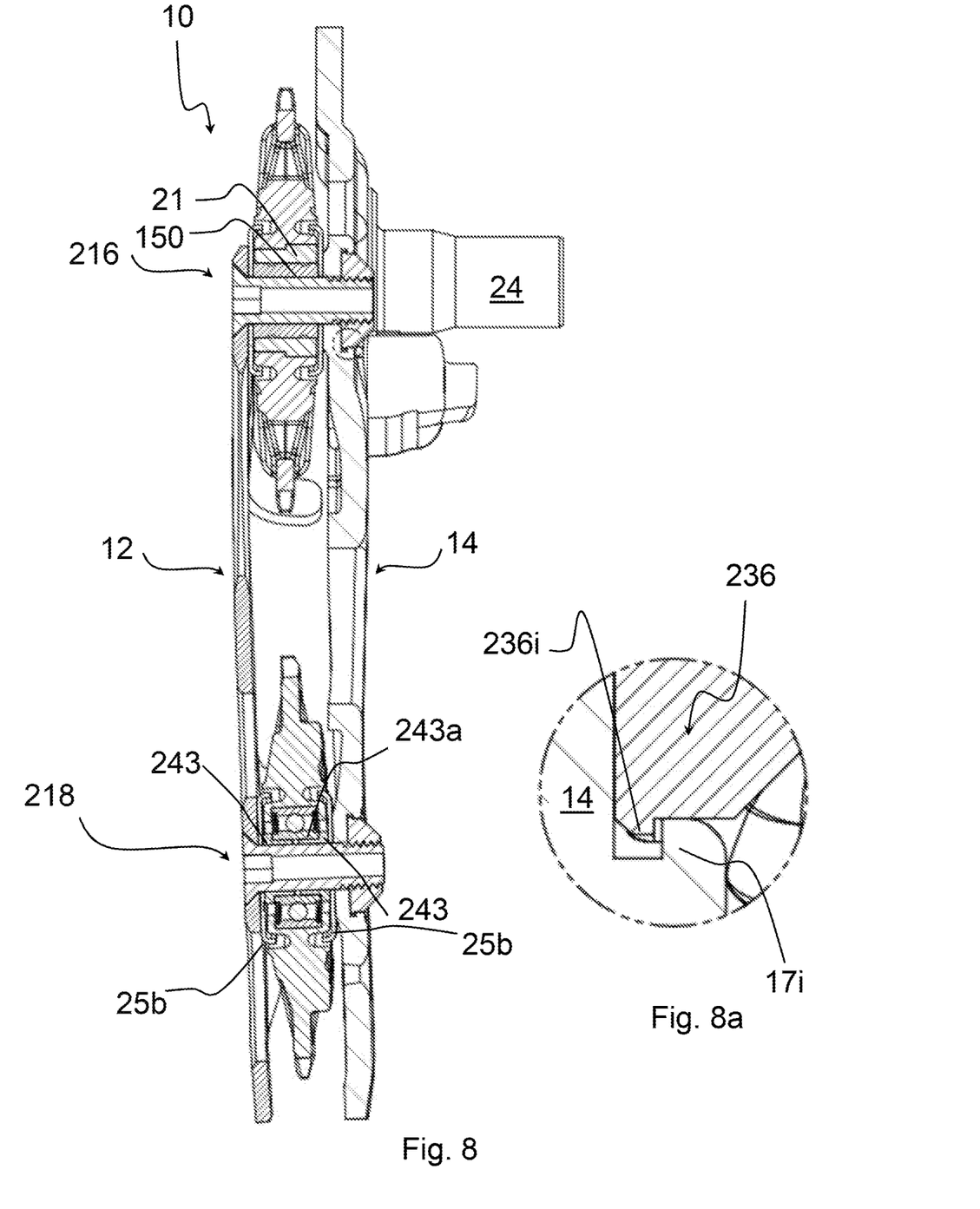
FIG. 8 is a cross section view of the rocker of FIG. 7.
FIG. 8a is an enlargement of the part circled in FIG. 8.

FIGS. 7, 8 and 8a show a third embodiment of a rocker 10 for a bicycle gear according to the present invention.

The components of the rocker 10 of FIGS. 7, 8 and 8a analogous or functionally equivalent to those of the rocker 10 of FIGS. 1-6 are indicated with the same reference numeral and for their description reference is made to what is stated above.

The rocker 10 comprises an inner plate 12, an outer plate 14, a pair of pins 216, 218 integral with the inner 12 and outer 14 plates, and a pair of toothed wheels 20, 22 arranged between the inner 12 and outer 14 plates.

The rocker 10 of FIGS. 7, 8 and 8a differs from the rocker 10 of FIGS. 1-3 and from the rocker 10 of FIGS. 4-6 substantially in the pins 216 and 218.

The pin 216 is defined by a screw 226 and a female screw 236.

The screw 226 has a head 226a in which an abutment surface 226b at the inner plate 12 is defined. The abutment surface 226b has frusto-conical shape, unlike the abutment surfaces 26b and 126b of the screws 26 and 126 of the previous embodiments of the invention, which are substantially flat.

The head 226a of the screw 226 is housed in a recess formed in the inner plate 12 and on which the through hole 12a erupts. Such a recess comprises an abutment surface, having frusto-conical shape, for the abutment surface 226b of the head 226a of the screw 226.

The screw 226 further has a shank 226c inserted in the through holes 12a and 14a and having a free end portion in which an outer threading 226d is defined.

The female screw 236 is a nut in which an abutment surface 236b at the outer plate 14 is defined.

The female screw 236 further has an inner threading 236d that is engaged with the outer threading 226d of the screw 226.

The female screw 236 comprises an outer surface having a shaped portion to make an anti-rotational shape coupling with the outer plate 14. Such a shaped portion is defined by a pair of flat surfaces 236e, substantially parallel and diametrically opposite.

The female screw 236 is housed in a recess 17 formed in the outer plate 14 and on which the through hole 14a erupts. The recess 17 has a shaped portion of shape at least partially matching the shaped portion of the female screw 236. Such a shaped portion is defined by a pair of flat surfaces 17a, substantially parallel and diametrically opposite, which cooperate in abutment with the flat surfaces 236e of the female screw 236.

The recess 17 comprises an abutment surface 17b for the abutment surface 236b of the female screw 236.

Furthermore, as pointed out in FIG. 8a, the female screw 236 comprises projecting portions 236i coupled with corresponding undercut portions 17i made in the recess 17.

The toothed wheel 20 is rotatably mounted on a bush 150 fitted with or without interference on the screw 226, in particular on part of the portion of the shank 226c of the screw 226 in which the outer threading 226d is not defined.

The bush 150 acts as a rotation bush of the toothed wheel 20.

The toothed wheel 20 comprises, in radially inner position, an annular element 21 made from an anti-friction material.

In analogous manner to the pin 216, the pin 218 is defined by a screw 228 and a female screw 238.

The screw 228 has a head 228a in which an abutment surface 228b at the inner plate 12 is defined. The abutment surface 228b has frusto-conical shape.

The head 228a of the screw 228 is housed in a recess formed in the inner plate 12 and on which the through hole 12b erupts. Such a recess comprises an abutment surface, having frusto-conical shape, for the abutment surface 228b of the head 228a of the screw 228.

The screw 228 further has a shank 228c inserted in the through holes 12b and 14b and having a free end portion in which an outer threading 228d is defined.

The female screw 238 is a nut in which an abutment surface 238b at the outer plate 14 is defined.

The female screw 238 further has an inner threading 238d that is engaged with the outer threading 228d of the screw 228.

The female screw 238 comprises an outer surface having a shaped portion to make an anti-rotational shape coupling with the outer plate 14. Such a shaped portion is defined by a pair of flat surfaces 238e, substantially parallel and diametrically opposite.

The female screw 238 is housed in a recess 19 formed in the outer plate 14 and on which the through hole 14b erupts. The recess 19 has a shaped portion of shape at least partially matching the shaped portion of the female screw 238. Such a shaped portion is defined by a pair of flat surfaces 19a, substantially parallel and diametrically opposite, which cooperate in abutment with the flat surfaces 238e of the female screw 238.

The recess 19 comprises an abutment surface 19b for the abutment surface 238b of the female screw 238.

Furthermore, the female screw 238 comprises projecting portions 238i coupled with corresponding undercut portions 19i made in said recess 19.

The toothed wheel 22 is rotatably mounted on a rolling bearing 42, which is interposed between pin 218 and toothed wheel 22 itself.

In particular, as illustrated in the example of FIG. 8, an inner ring 42a of the rolling bearing 42 is fitted with or without interference on respective housing seats 243a provided on a pair of annular spacer elements 243 fitted with or without interference on the shank 228c of the screw 228.

The annular spacer elements 243 are arranged near, respectively, the surfaces of the inner plate 12 and of the outer plate 14 facing the toothed wheel 22.

The rocker 10 of FIGS. 7, 8 and 8a further comprises a pair of annular protection discs 25a and 25b, which are fitted on each of the pins 216 and 218 and that are arranged at opposite parts with respect to the toothed wheels 20 and 22, respectively.

In the non-limiting example of FIG. 8, the annular protection discs 25a and 25b of the pins 216 and 218 are fitted on the shank 226c of the screw 226.

The annular protection discs 25a of the pin 216 are arranged at opposite parts with respect to the bush 150.

In the non-limiting example of FIG. 8, the annular protection discs 25b of the pin 218 are interposed between the annular spacer elements 243 and the inner 12 and outer 14 plates.

The inner 12 and outer 14 plates are preferably made from carbon fiber.

Of course, those skilled in the art can make numerous modifications and variants to the invention described above, in order to satisfy specific and contingent requirements, all of which are in any case within the scope of protection of the present invention as defined by the following claims.

What is claimed is:

1. A rocker for a bicycle gear, comprising:
    an inner plate;
    an outer plate;
    a pair of pins integral with said inner and outer plates;
    a pair of toothed wheels arranged between said inner and outer plates, each of said pair of toothed wheels is rotatably mounted on a respective pin of said pair of pins;
    wherein at least one of said pair of pins is inserted in non-threaded through holes formed in said inner and outer plates and at least one of said pair of pins is defined by:
       a male screw having an outer threading and an abutment surface at one of said inner and outer plates;
       a female screw having an inner threading engaged with said male screw outer threading and an abutment surface at the other one of said inner and outer plates,
       wherein a portion of the female screw extends (i) at least partially inside of said other one of said inner and outer plates and (ii) at least partially inside at least one of the toothed wheels of the pair of toothed wheels.

2. The rocker according to claim 1, wherein said female screw comprises a coupling seat with a mounting tool.

3. The rocker according to claim 1, wherein said female screw comprises an outer surface having a shaped portion to make an anti-rotational shape coupling with one of said inner and outer plates.

4. The rocker according to claim 3, wherein said outer surface is housed in a recess formed in said one of said inner and outer plates and having a shaped portion of shape at least partially matching the shaped portion of said female screw.

5. The rocker according to claim 3, wherein said shaped portion is defined by at least one flat surface.

6. The rocker according to claim 1, wherein at least one of said pair of toothed wheels is rotatably mounted directly on said female screw.

7. The rocker according to claim 1, wherein at least one of said pair of toothed wheels is rotatably mounted on a bush fitted with or without interference on said female screw and/or on said male screw.

8. The rocker according to claim 1, wherein at least one of said pair of toothed wheels is rotatably mounted on a rolling bearing fitted with or without interference on said female screw and/or on said male screw.

9. The rocker according to claim 1, wherein the abutment surface of said female screw is housed in a recess formed in one of said inner and outer plates around the respective through hole, said recess comprising an abutment surface for said female screw and on which said through hole erupts.

10. The rocker according to claim 9, wherein said female screw comprises projecting portions coupled with corresponding undercut portions made in said recess.

11. The rocker according to claim 1, wherein at least one of said pair of toothed wheels comprises, in radially inner position, an annular element made from an anti-friction material.

12. The rocker according to claim 1, further comprising a pair of annular protection discs fitted on at least one of said pair of pins and arranged at opposite parts with respect to the toothed wheel mounted on said pin.

13. The rocker according to claim 1, wherein said inner and outer plates are made from an aluminum alloy or carbon fiber or technopolymer.

14. A rocker for a bicycle gear, comprising:
an inner plate;
an outer plate;
a pair of pins integral with said inner and outer plates;
a pair of toothed wheels arranged between said inner and outer plates, each of said pair of toothed wheels is rotatably mounted on a respective pin of said pair of pins;
wherein at least one of said pair of pins is defined by:
a male screw having an outer threading and an abutment surface at one of said inner and outer plates; and,
a female screw having an abutment surface at the other one of said inner and outer plates and an inner threading that is engaged with said outer threading, wherein the female screw is partially housed inside a recess formed in said other one of said inner and outer plates, said other one of said inner and outer plates includes a first surface facing the pair of toothed wheels and a second surface that is opposite of the first surface, the recess defining an abutment surface that engages the abutment surface of the female screw, the female screw extending partially outside of said other one of said inner and outer plates only from said second surface.

\* \* \* \* \*